United States Patent [19]
Micknowicz

[11] Patent Number: 5,403,061
[45] Date of Patent: Apr. 4, 1995

[54] CONTROL SYSTEM FOR HINGED BODY VEHICLES

[76] Inventor: John J. Micknowicz, 51 Carroll Dr., Wappingers Falls, N.Y. 12590

[21] Appl. No.: 239,128

[22] Filed: May 6, 1994

[51] Int. Cl.⁶ .............................................. B60P 7/02
[52] U.S. Cl. ..................................... 296/100; 296/164
[58] Field of Search ........................ 296/100, 164, 167

[56] References Cited

U.S. PATENT DOCUMENTS

| | | | |
|---|---|---|---|
| 2,886,375 | 5/1959 | Crawford | 296/100 |
| 4,142,760 | 3/1979 | Dockery et al. | 296/100 |
| 4,629,243 | 12/1986 | Jensen | 296/100 |
| 4,819,981 | 4/1989 | Moe et al. | 296/100 |
| 4,943,108 | 7/1990 | Turnbull | 296/100 |
| 5,018,777 | 5/1991 | Swenson et al. | 296/100 |
| 5,131,712 | 7/1992 | Heinz | 296/100 |
| 5,207,470 | 5/1993 | Rafi-Zadeh | 296/100 X |

Primary Examiner—Joseph Pape
Attorney, Agent, or Firm—Rhodes & Ascolillo; Henry S. Miller; David L. Baker

[57] ABSTRACT

The invention relates to a cap for pickup truck cargo bodies that is secured in place by hinges and may be tilted by removing the hinge pins on one side and removed by removing the hinge pins from both sides. Rods are provided which engage the hinge cylinder on the body and on the cap and thereby secure and support the cap from dynamic forces that might otherwise cause the cap to lift or drop.

7 Claims, 6 Drawing Sheets

CONTROL SYSTEM FOR HINGED BODY VEHICLES

BACKGROUND OF THE INVENTION

1. Field of the Invention

This invention relates generally to the field of vehicles and more specifically to the control of vehicles equipped with hinged bodies and body covers.

2. Description of the Prior Art

The incorporation of a hinged body with a vehicle chassis is well known in the prior art and dates back at least to the first railroad freight carrying cars and to the ore carrying cars in the mining industry.

The motor vehicle industry is a relative new comer to hinged bodies but the truck divisions of motor vehicle manufactures have found reasons to include hinges on all sides of cargo bodies and cabs. Most of the interest in the hinged body centers around the hinge itself, size and placement, and the means for tilting the body relative to the chassis, power, manual and manual assist.

Since most bodies are rotated or tilted when the vehicle is at rest, research centers around the static forces involved in that mode. Little consideration is given to the dynamic forces that come into play when the vehicle is moved at a substantial speed while the body is tilted away from normal.

By way of example, U.S. Pat. No. 4,629,243 issued Dec. 16, 1986 to Jensen discloses a hinge system for open bed vehicles and allows that the cover may be tilted from either side and even supplies a rod 35 to support the cover in the tilted position, however nothing prevents the cover from lifting off the rod in the event of the application of dynamic wind forces.

Similarly U.S. Pat. No. 4,819,981 issued Apr. 11, 1989 to Moe et al. show a bed cover mounted in a hinged relation with the vehicle body and biased arms 64 and 70 for supporting the cover in the tilted position. Moe et al concede that the cover is not stable unless the cover is down and locked. U.S. Pat. No. 4,943,108 issued Jul. 24, 1990 to Turnbull discloses a hinged cover in two sections restrained by chains in the tilted position. U.S. Pat. No. 5,131,712 issued Jul. 21, 1992 to Heinz relates to a frame attached to a bed cover that is hinged on one side and utilizes a power unit 58 to raise and lower the cover and further supplies a flexible connector 94 to prevent over rotation of the cover about its hinge.

It can be clearly seen then, that there is a continuing need for a simple yet secure means for controlling the tilt of vehicle bed covers under both static and dynamic conditions.

SUMMARY OF THE INVENTION

The invention provides a reliable, secure apparatus for supporting bed covers for cargo bodies on motor vehicles, and accordingly these are among the objects of the invention.

The invention is particularly adaptable to bed covers that are hinged to the cargo body by means of a conventional hinge having a plate for mounting on each relative body with complementary hinge pin cylinders. Typically two hinges are utilized on each longitudinal side of the cargo body. A first embodiment of the invention includes a pair of support rods angulated at each end transverse to the longitudinal axis of the rod and adapted to fit into the hinge plate cylinder, when the hinge pin has been removed and the cover tilted. The rod is secured in position by a cotter pin or hairpin of known and conventional design. A second embodiment includes a first rod angulated at both ends and adapted to engage a hinge pin cylinder as described and a second rod attached to the front body panel of the cargo body and adapted to support the bed cover regardless of which side is elevated and tipped.

It is therefore an object of the invention to provide a new and improved control system for hinged body vehicle covers.

It is another object of the invention to provide a new and improved apparatus for controlling the movement of hinged vehicle body covers.

It is a further object of the invention to provide a new and improved means for securing hinged body vehicle covers against dynamic wind forces.

It is still another object of the invention to provide a new and improved apparatus for supporting hinged body vehicle covers.

It is still a further object of the invention to provide an new and improved apparatus for controlling the movement of hinged vehicle body covers that is low in cost.

It is another object of the invention to provide a new and improved apparatus for securing and supporting a hinged vehicle body cover that may be easily and efficiently manufactured and marketed.

These and other advantages, features and objects of the invention will become more apparent from the following description taken in connection with the illustrative embodiment in the accompanying drawings.

DETAILED DESCRIPTION OF THE PREFERRED EMBODIMENT

Figure 1:
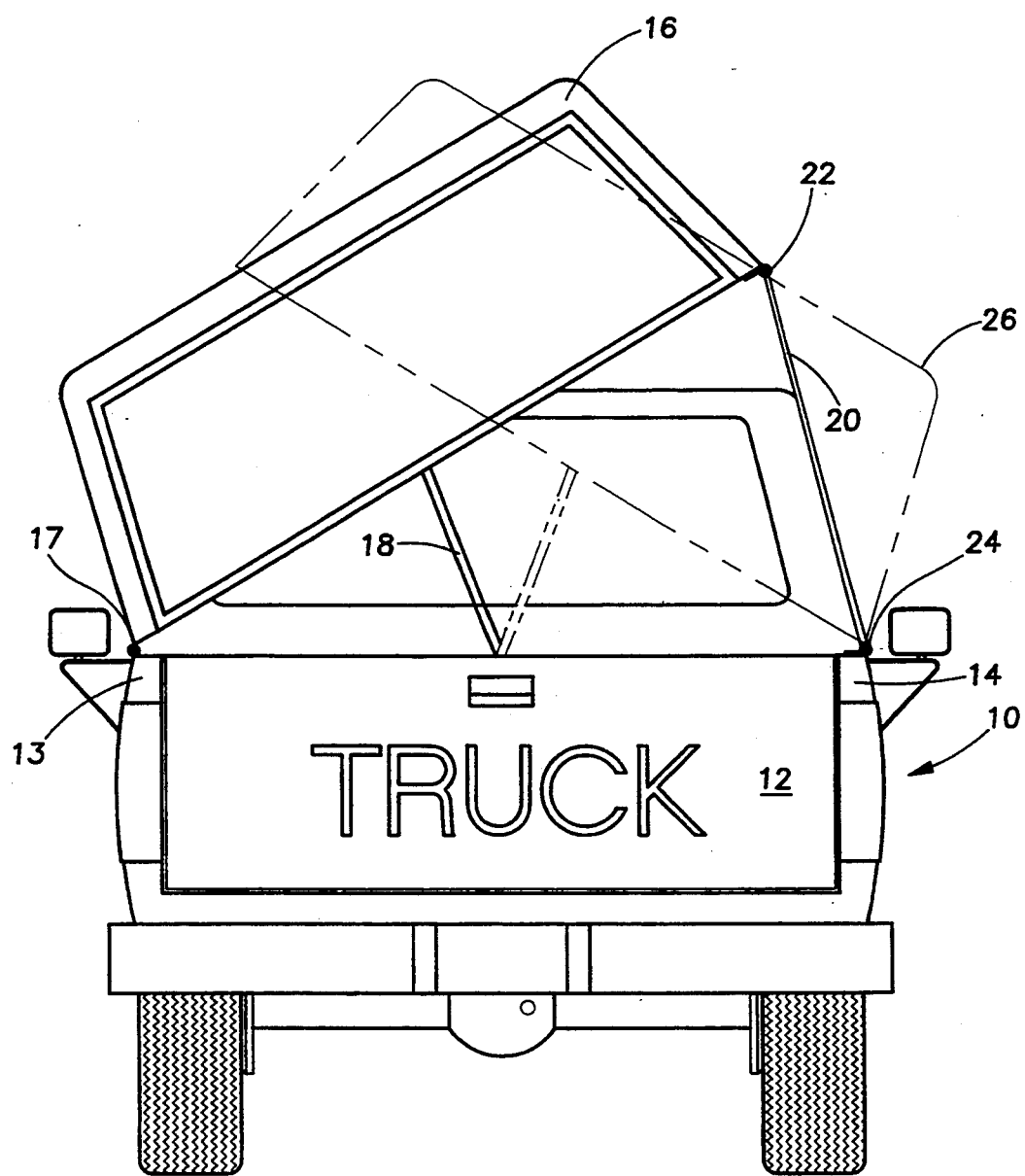
FIG. 1 is an end view of a truck showing a bed cover in the tilted condition.
Figure 2:
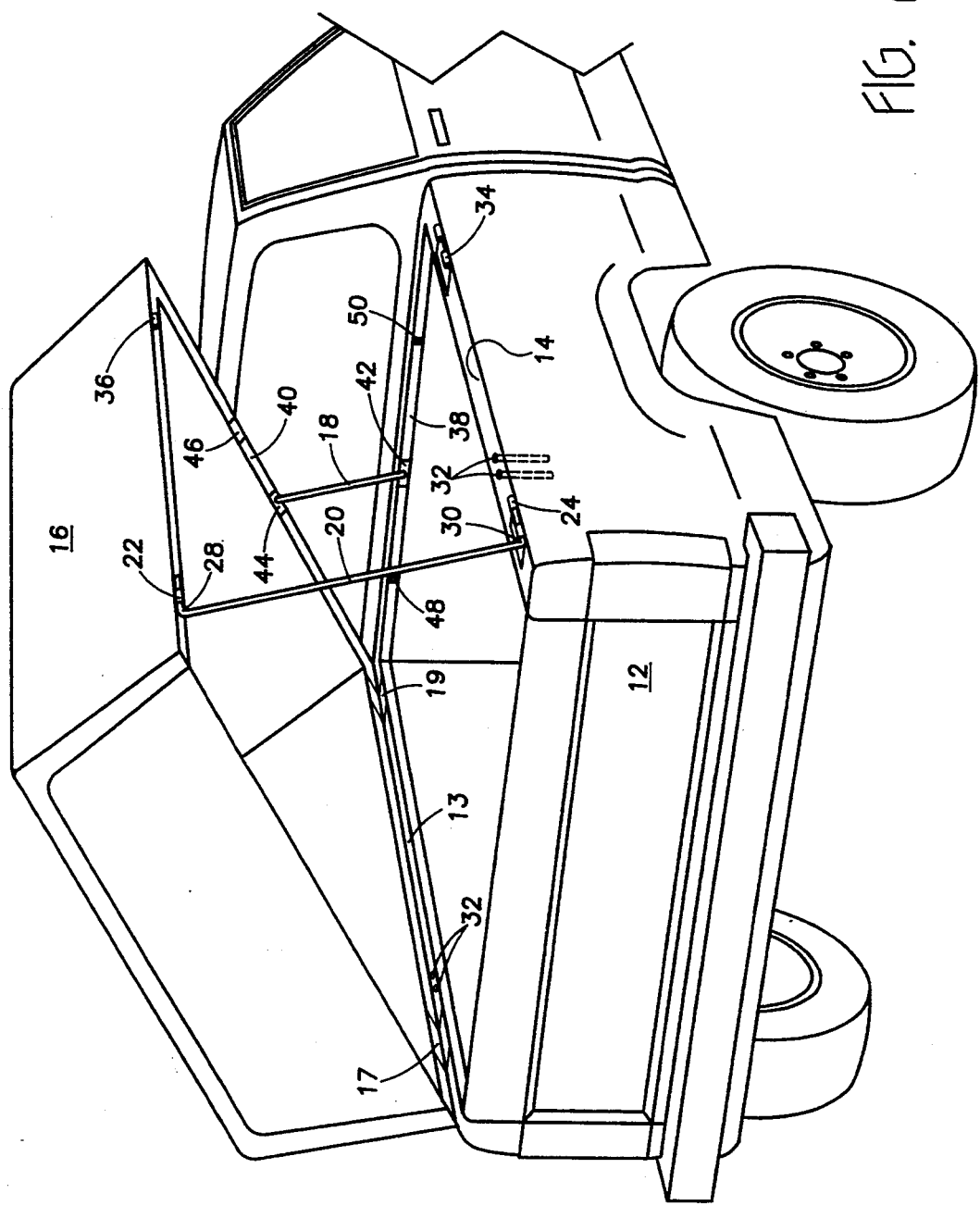
FIG. 2 is a perspective view of one embodiment of the invention installed between a cargo body and bed cover.

Referring now to FIG. 1 there is shown a well known pickup truck with a cargo body shown generally at 10 with tailgate 12 and side rails 13 and 14. A cover 16 for the body is shown tilted by pivoting about a hinge 17 mounted between the side rail 13 and the cover. The cover is supported by the front-center mounted rod 18 and the rear-side mounted rod 20. Rod 20 is mounted by securing the ends in the hinge pin cylinders of hinge plates 22 and 24 mounted on the cover rail and side rail respectively. Since the cover is double hinged, that is hinged on both side rails, it has the capability of tilting to either side. FIG. 2 shows rods 18 and 20 supporting and securing the cover 16. Rod 20 has a longitudinal axis and a bend near each end at 28 and 30 directing the rod ends transverse to the longitudinal axis for engagement with the hinge pin cylinders of hinge plates 22 and 24. In order to tilt the cover, hinge pins from the lifting side must be removed and stored. A hinge pin storage area is provided by apertures 32 in the side rail. The forward hinge plates are shown at 34 and 36. The forward-center support rod 18 is positioned between the body front rail 38 and the cover front rail 40. Reinforcing plates 42,44 and 46 are mounted at the points of engagement of the support rod 18. The support rod is rotated to either side when not in use and stored in either clip 48 or 50. To close the cover, hinge pins are removed from the storage area 32 and rods 18 and 20 are removed and stored. The cover is lowered as it pivots about hinges 17,19 and the complementary hinge pin cylinders engage and the hinge pins restored and locked in position.

Figure 3:
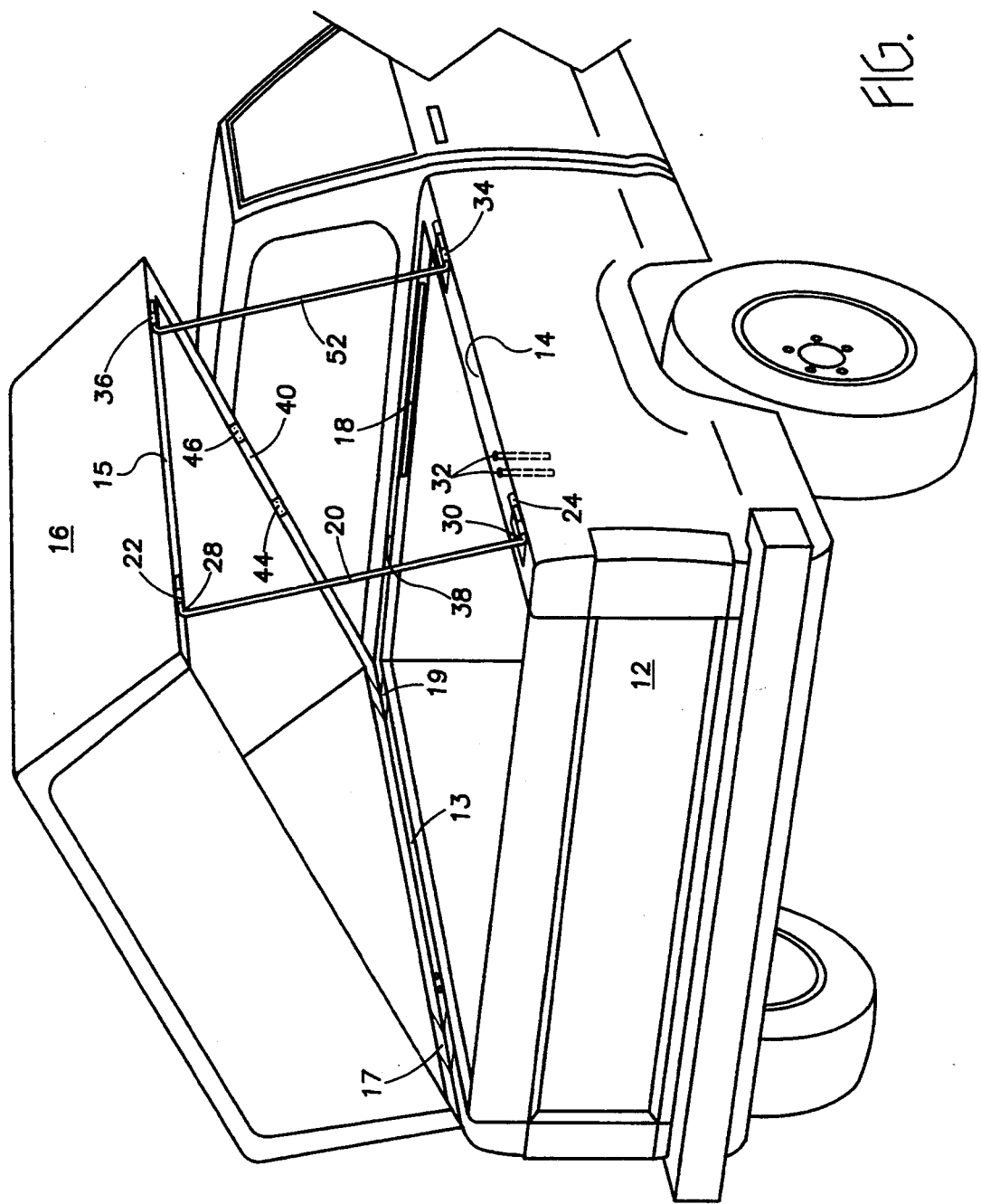
FIG. 3 is a perspective view of an alternative embodiment of the invention installed between a cargo body and bed cover.

FIG. 3 shows an alternative embodiment for utilized for additional convenience and security. A rod 52 is utilized to securely engage the hinge pin cylinders of forward hinge plates 34 and 36. Rod 52 being the same is size, shape and dimension as rod 20. These two rods will withstand any foreseeable dynamic forces tending to act adversely on the cover 16.

Figure 4:
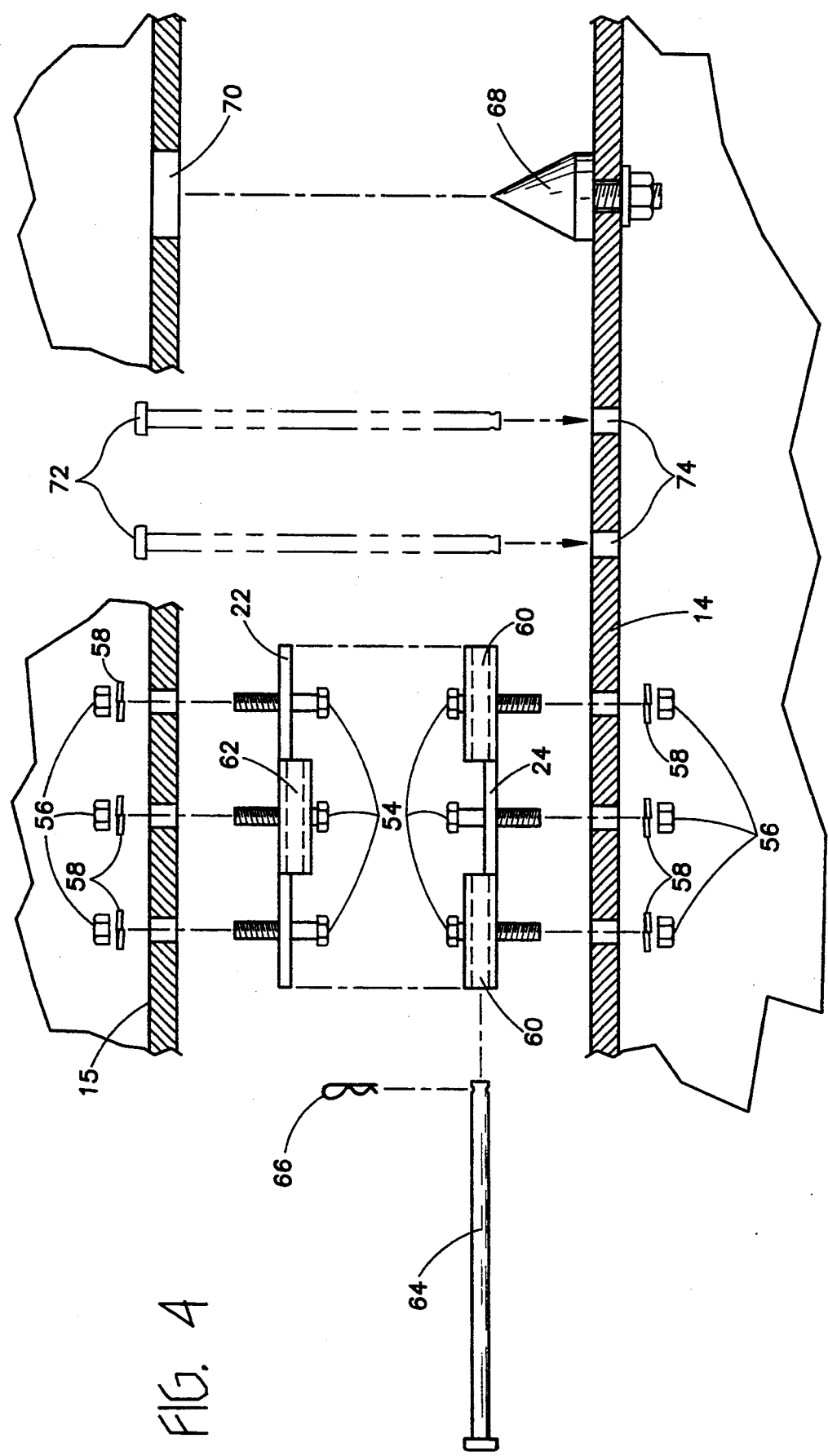
FIG. 4 is an exploded view, partly in cross section, of a representative hinge and its connecting surfaces.

FIG. 4 shows a typical hinge engaging the body side rail 24 and cover side rail 15. Hinge plates 22 and 24 are secured to their respective side rails by threaded bolts 54 nuts 56 and lock washers 58. Plate 24 contains two hinge pin cylinders 60 and plate 22 contains a single cylinder 62. The cylinders are complementary and are held by hinge pin 64 which may be secured by hairpin 66. The size of the hinge will depend on the size and weight of the cover as well as the wind force loading anticipated. Guide pin 68 is matched with aperture 70 to facilitate the alignment of the hinge pin cylinders during closure of the cover. Hinge pins 72 are stored in the side rail apertures 72 when not in use.

Figure 5:
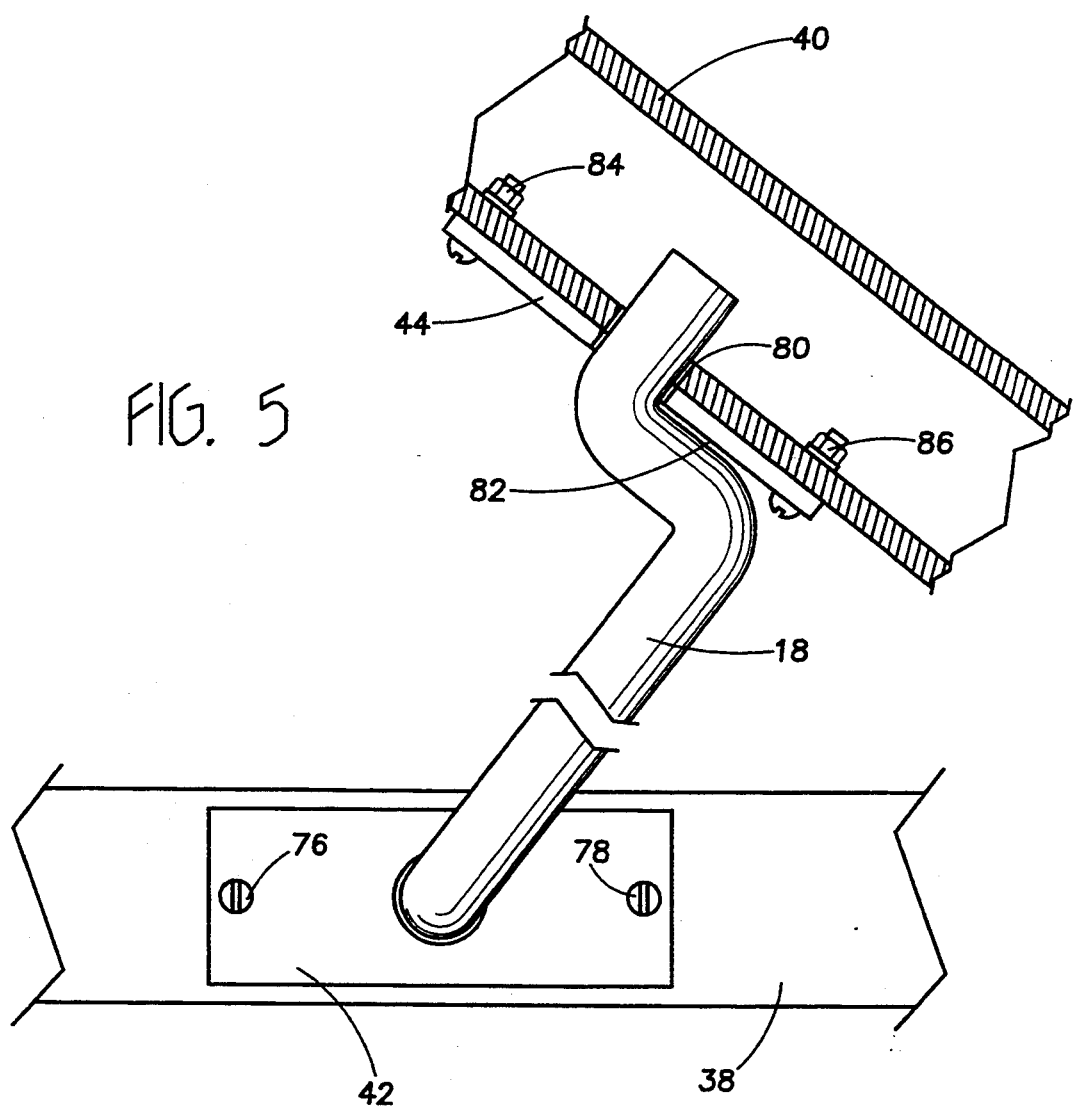
FIG. 5 is a view of the alternative support rod and the surfaces with which it interfaces.

Referring now to FIG. 5 rod 18 is mounted to the body front rail 38 and supported by reinforcing plate 42 held in place by bolts 76,78. Rod 18 engages body front rail 40 by passing through aperture 80 where surface 82 of rod 18 abuts reinforcing plate 44 which is held in place by fasteners 84,86.

Figure 6:
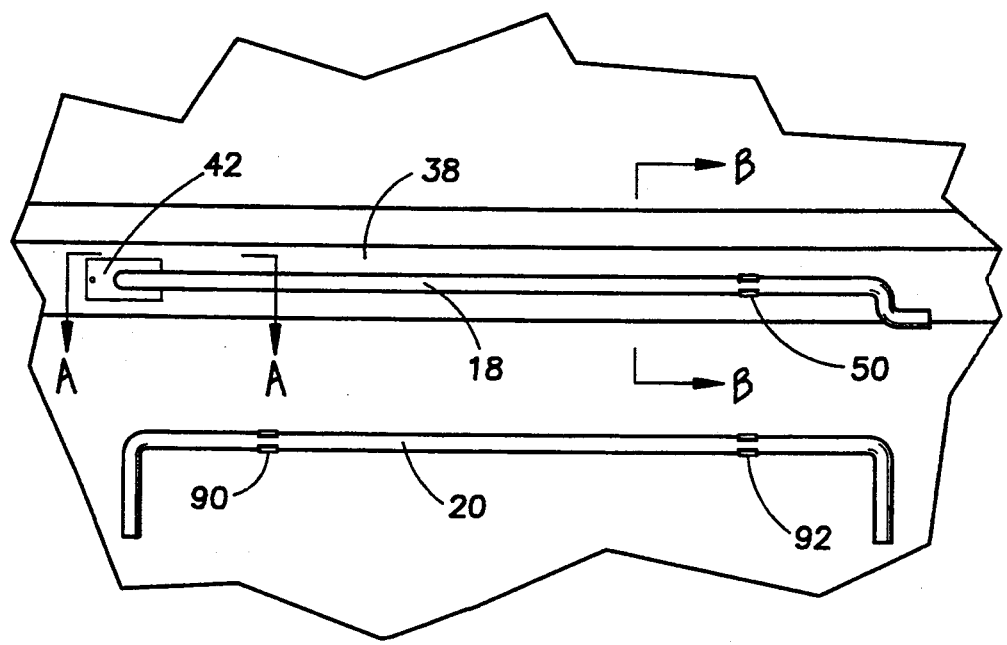
FIG. 6 is an elevation view of the alternative support rod in the stored position.
Figure 6B:
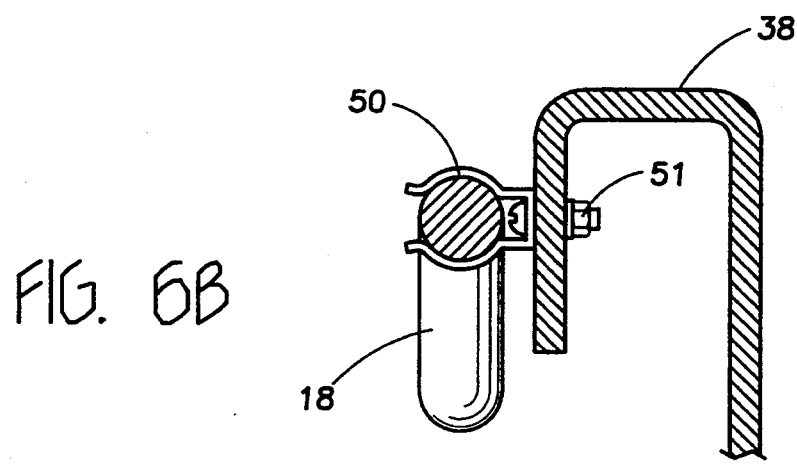
FIG. 6B is a view, partly in cross section, taken along line B—B as seen in FIG. 6.
Figure 6A:
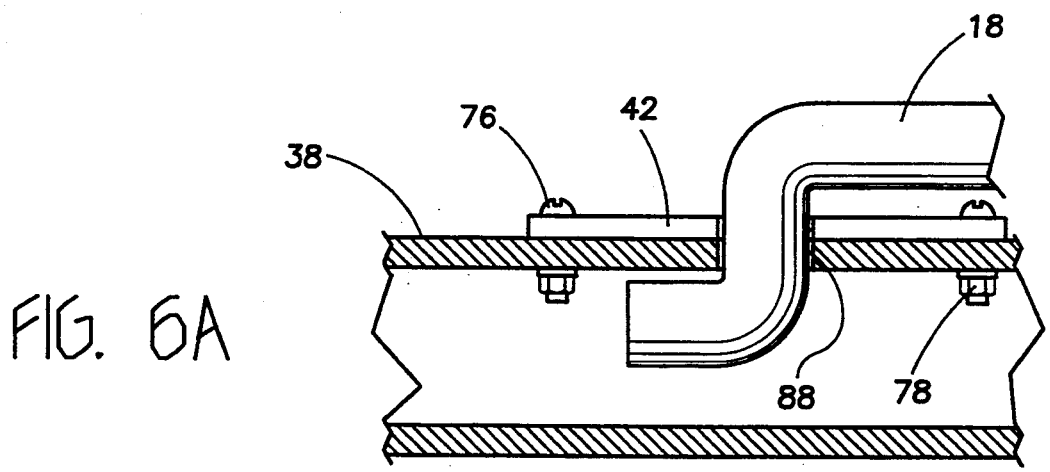
FIG. 6A is a cross sectional view taken along line A—A as seen in FIG. 6.

Concerning FIGS. 6,6A and 6B, the body front rail 38 is shown with rods 18 and 20 mounted for storage. The fixed end of rod 18 passes through front rail aperture 88 and reinforcement plate 42 which is held by fasteners 76,78. The annular shape of rod 18 allows it to be removed and disengaged from the rail as needed. The extended end of the rod is stored in spring clip 50 secured to the body rail by fastener 51. Rod 20 is stored on the front rail using spring clips 90 and 92. Other rods such as rod 52 would be stored in a similar manner. Rods 20 and 52 are, in practice, between forty-two and fifty-two inches in length.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A system for supporting a hinged cover on a cargo body of a pickup truck when the cover is tilted to an open position, comprising:
   a hinge which attaches the cover to the cargo body, the hinge further comprising:
      at least one hinge pin cylinder connected to the cover;
      at least one hinge pin cylinder connected to the cargo body; and
      a hinge pin removably engageable through each of the hinge pin cylinders; and
   a rod having a longitudinal axis and a curve at each end transverse to the longitudinal axis of the rod;
   one end of the rod being slidingly engageable with the at least one hinge pin cylinder connected to the cover, and the other end of the rod being slidingly engageable with the at least one hinge pin cylinder connected to the cargo body when the hinge pin is removed from each of the hinge pin cylinders.

2. The system as described in claim 1, further comprising a pair of laterally spaced rods each being slidingly engageable with corresponding hinge pin cylinders on the cover and the cargo body.

3. The system as described in claim 1, further comprising a second rod mounted on a forward panel of the cargo body, the second rod engaged at one end through an aperture in the forward panel and engaged at the other end through an aperture in the cover.

4. The system as described in claim 1, further comprising a means for guiding the cover into a closed hinge engagement position.

5. The system as described in claim 1, further comprising a means for receiving and storing hinge pins removed from the hinge.

6. The system as described in claim 1, wherein the rod is substantially forty-five inches in length.

7. The system as described in claim 2, wherein the pair of rods are each substantially fifty-two inches in length.

* * * * *